(12) United States Patent
Nakamatsu et al.

(10) Patent No.: US 7,620,557 B2
(45) Date of Patent: Nov. 17, 2009

(54) CHARGING SYSTEM

(75) Inventors: Yoshiki Nakamatsu, Chiba (JP); Shinichi Masaki, Fukuoka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1473 days.

(21) Appl. No.: 10/050,135

(22) Filed: Jan. 18, 2002

(65) Prior Publication Data

US 2002/0120463 A1 Aug. 29, 2002

(30) Foreign Application Priority Data

Feb. 28, 2001 (JP) ............................. 2001-054056

(51) Int. Cl.
 *G06Q 10/00* (2006.01)
(52) U.S. Cl. ........................ 705/1; 455/412.1; 709/223; 379/201.03
(58) Field of Classification Search ..................... 705/1
 See application file for complete search history.

(56) References Cited

U.S. PATENT DOCUMENTS 6,272,332 B1 * 8/2001 Matsumoto et al. ...... 455/412.1
6,502,130 B1 * 12/2002 Keeler et al. ................ 709/223
6,542,593 B1 * 4/2003 Bowman-Amuah .... 379/201.03

FOREIGN PATENT DOCUMENTS

| JP | 10-027036 | 1/1998 |
| JP | 11-355342 | 12/1999 |
| JP | 2000-082032 | 3/2000 |
| WO | WO 00/21310 | 4/2000 |

* cited by examiner

*Primary Examiner*—Hani Kazimi
*Assistant Examiner*—Olabode Akintola
(74) *Attorney, Agent, or Firm*—Rabin & Berdo, PC (57) ABSTRACT

A charging system has: a plurality of client apparatuses connected to a network; a server apparatus which provides a service to the client apparatuses via the network; a charging apparatus connected to the network in order to make a charge regarding the provision of the service; a plurality of first processing apparatuses which are provided for the network in order to control the provision of the service from the server apparatus to the client apparatuses and accumulate charge information by the charging apparatus with respect to the service when the service is provided to the client apparatuses via the first processing apparatuses; and a second processing apparatus which has a cyclic unit which circulates among the first processing apparatuses via the network, collects the charge information accumulated in the first processing apparatuses by the circulation of the cyclic unit, and provides the collected charge information to the charging apparatus.

20 Claims, 7 Drawing Sheets

CHARGING SYSTEM

BACKGROUND OF THE INVENTION

1. Field of the Invention

The invention relates to a charging system for charging a client apparatus for provision of services from a server apparatus to the client apparatus on a network.

2. Related Background Art

In such a kind of conventional charging system, there are a plurality of server apparatuses which provide services such as music data and image data to a plurality of client apparatuses, and when the provision of the services is requested by those plurality of client apparatuses, a plurality of server apparatuses provide the services to the client apparatuses via a network in response to each of those requests and transmit charge information necessary for charging, such as names and the number of services, to a charging apparatus for charging for the services through the network. When the charge information is received from a plurality of server apparatuses, the charging apparatus charges the client apparatuses which received the services a fee regarding the provision of the services to on the basis of the received charge information.

In the foregoing conventional charging system, however, each time the provision of the services is individually requested by a plurality of client apparatuses, a plurality of server apparatuses transmit the charge information to the charging apparatus through the network. Therefore, if the requests to a plurality of server apparatuses from a plurality of client apparatuses concentrate in a short time, the transmission of the charge information to the charging apparatus through the network by a plurality of server apparatuses concentrates in a short time.

SUMMARY OF THE INVENTION

It is an object of the invention to provide a charging system for preventing generation of congestion due to concentrated transmission of charge information onto a network between each of a plurality of server apparatuses and a charging apparatus.

To accomplish the above object, according to the first aspect of the invention, there is provided a charging system comprising: a plurality of client apparatuses each of which is connected to a network; a server apparatus which provides at least one service to the plurality of client apparatuses via the network; a charging apparatus connected to the network in order to make a charge regarding the provision of the service; a plurality of first processing apparatuses which are provided for the network in order to control the provision of the service from the server apparatus to the client apparatuses and accumulate information for charging by the charging apparatus with respect to the service when the service is provided to the client apparatuses via the first processing apparatuses; and a second processing apparatus which has a cyclic unit which circulates among the plurality of first processing apparatuses via the network, collects the information for charging accumulated in each of the first processing apparatuses by the circulation of the cyclic unit, and provides the collected information for charging to the charging apparatus.

For example, the second processing apparatus has the cyclic unit for each service content, and the cyclic unit corresponding to each service content collects the information for charging in the plurality of first processing apparatuses, respectively.

Preferably, in the cyclic units of the second processing apparatus, times to start the circulation among the plurality of first processing apparatuses are different.

For example, the second processing apparatus has at least one cyclic unit corresponding to each of a plurality of service content, and the cyclic unit collects the information for charging accumulated in the plurality of first processing apparatuses every service content.

For example, the first processing apparatus accumulates the information for charging of the plurality of services.

For example, the first processing apparatus controls the provision of the services to the client apparatuses from the server apparatus with reference to an amount of money which has been predetermined by the client apparatus for the purpose of providing the services.

For example, the first processing apparatus controls the provision of the services to the client apparatuses from the server apparatus with reference to a time which has been predetermined by the client apparatus for the purpose of providing the services.

Further, the charging system can also include a management terminal which controls the operation of at least one of the first processing apparatuses and the second processing apparatus.

The above and other objects and features of the present invention will become apparent from the following detailed description and the appended claims with reference to the accompanying drawings.

DETAILED DESCRIPTION OF THE PREFERRED EMBODIMENTS

Embodiments of a charging system according to the invention will now be described.

Embodiment 1

Figure 1:
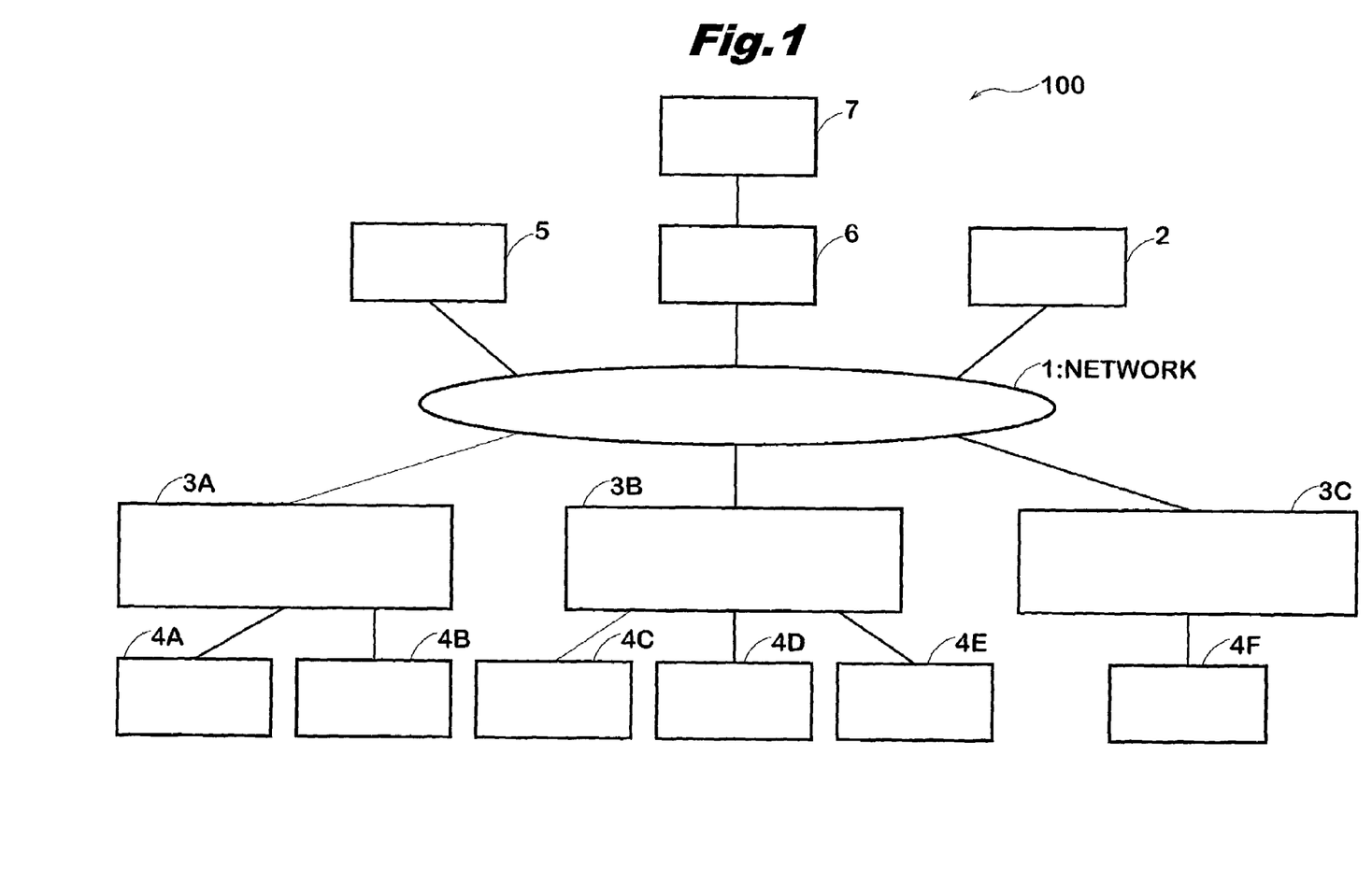
FIG. 1 is a diagram showing a construction of a charging system of the embodiment 1.

FIG. 1 shows a construction of a charging system of the embodiment 1. As shown in FIG. 1, a charging system 100 of the embodiment 1 comprises: a network 1; a server apparatus 2 connected to the network 1; a plurality of router apparatuses 3A to 3C which are connected to the network 1 and accumulate charge information, which will be explained hereinlater, in order to control provision of services by the server apparatus 2; a plurality of client apparatuses 4A to 4F which are connected to the router apparatuses 3A to 3C and receive the services from the server apparatus 2 via the router apparatuses; a charging apparatus 5 which is connected to the network 1 and charges for the provision of the services from the server apparatus 2 to the client apparatuses 4A to 4F; a managing apparatus 6 which collects the charge information by which the charging apparatus 5 charges by circulation among the router apparatuses 3A to 3C; and a management terminal 7 which issues an instruction to control the operations of the managing apparatus 6 and router apparatuses 3A to 3C, respectively.

The network 1 is constructed by, for example, the well-known Internet irrespective of a topology such as star type and delta type and physical layers such as radio and wired types.

The server apparatus 2 provides data such as music data, image data, or application software, as services, to the client apparatuses 4A to 4F by using a plurality of packets constructing the data. The packet is a conventional well-known packet. For example, the packet includes: a transmitting source (sender) address; a reception destination (receiver) address; a user name; data as contents of the services; a packet length; a sequence number showing the order of the packet; and the like.

For example, when the client apparatus 4A requests a provision of the music data from the server apparatus 2 via the network 1, the server apparatus 2 authenticates the client apparatus 4A or its user and, subsequently, provides a plurality of packets constructing the music data and having the construction as mentioned above to the client apparatus 4A through the router apparatus 3A of the network 1.

The router apparatuses 3A to 3C serving as first processing apparatuses are constructed by, for example, edge nodes. Generally, the edge nodes are route switching apparatuses which are provided at boundaries among a plurality of networks. When the services are provided to the client apparatuses by intersecting the boundary between the adjacent networks, the route switching apparatus transfers the services from one network to the other network. Since the router apparatuses 3A to 3C have the same construction, only the router apparatus 3A will be described hereinbelow.

Figure 2:
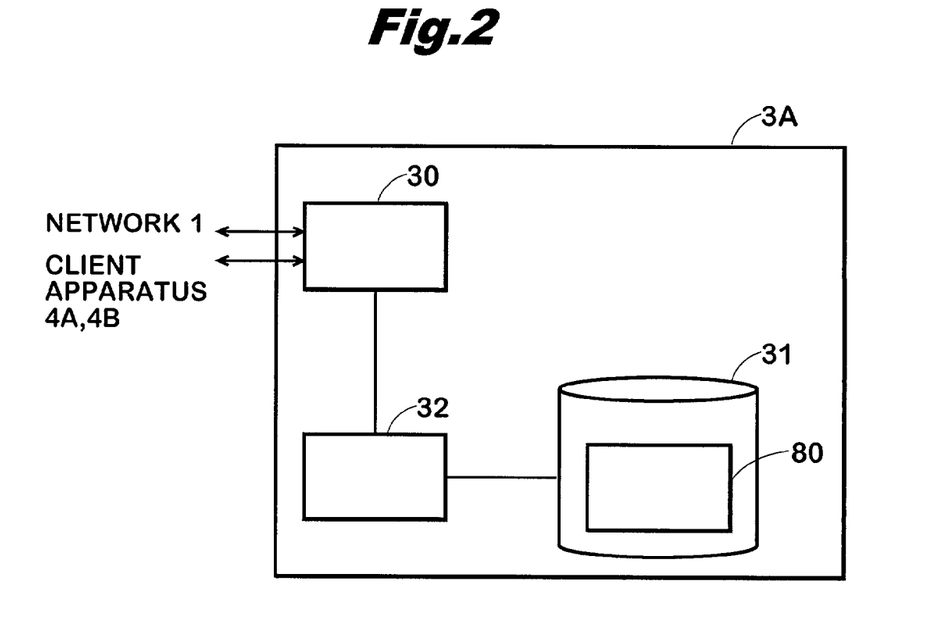
FIG. 2 is a diagram showing a construction of a router apparatus of the embodiment 1.

FIG. 2 shows a construction of the router apparatus. As shown in FIG. 2, the router apparatus 3A includes: a communication unit 30 which makes communication through the network 1 shown in FIG. 1 and mutual communication with the client apparatus 4A or 4B shown in FIG. 1; a storage unit 31 in which a resident unit 80 for accumulating charge information such as ID of the user of the client apparatus 4A or 4B which requested the services, kinds and content of the services, the number of services, charge amount to be charged, and the like has been stored; and a processing unit 32 which controls the operation of the whole router apparatus including the communication unit 30 and resident unit 80 and allows a cyclic unit 90 of the managing apparatus 6, which will be explained hereinlater, to function.

The communication unit 30 transfers the request for providing the services from the client apparatuses 4A and 4B to the server apparatus 2 through the network 1 and relays the services which are received from the server apparatus 2 through the network 1 to the client apparatuses 4A and 4B.

In the example shown in the diagram, the resident unit 80 stored in the storage unit 31 is constructed by executing a predetermined program stored in the storage unit 31 by the processing unit 32 and functions for accumulating the charge information. Besides the resident unit 80, for example, programs and data which are necessary for the processing unit 32 to monitor and control the communication unit 30 and storage unit 31 have previously been stored in the storage unit 31.

It is desirable that a module for reducing a size of cyclic unit 90 has previously been stored in the storage unit 31 and the storage of the module is performed by downloading it from the managing apparatus 6 in order to efficiently revise the module.

The processing unit 32 controls communication by the communication unit 30 and an access to the storage unit 31 and makes the resident unit 80 function. Further, the processing unit 32 makes the cyclic unit 90 function for the purpose of circulating the cyclic unit 90 which is managed by the managing apparatus 6, which will be explained hereinlater.

Referring again to FIG. 1, the client apparatuses 4A to 4F are, for example, conventional well-known personal computers, workstations, or the like and used by general unspecified users. When the provision of the services is requested by the unspecified users in order to allow the charge with respect to the service provision to be certainly made or the like as mentioned above, the server apparatus 2 authenticates the users or client apparatuses who/which requested the service provision prior to providing the services.

The charging apparatus 5 performs an automatic withdrawal from a financial institution, sending of a bill by Email or mail, or the like to the users who received the services provided by the server apparatus 2 in accordance with the charge information which is sent from the managing apparatus 6. The process such as automatic withdrawal from a financial institution, sending of a bill by Email or mail, or the like is executed in a manner similar to that in the conventional well-known charging apparatus.

The managing apparatus 6 as a second processing apparatus has a function for managing the whole charging system 100. Specifically speaking, the managing apparatus 6 manages charging system information which is necessary for charging and will be explained hereinlater, collects the charge information from the router apparatuses 3A to 3C, and transfers the collected charge information to the charging apparatus 5.

Figure 3:
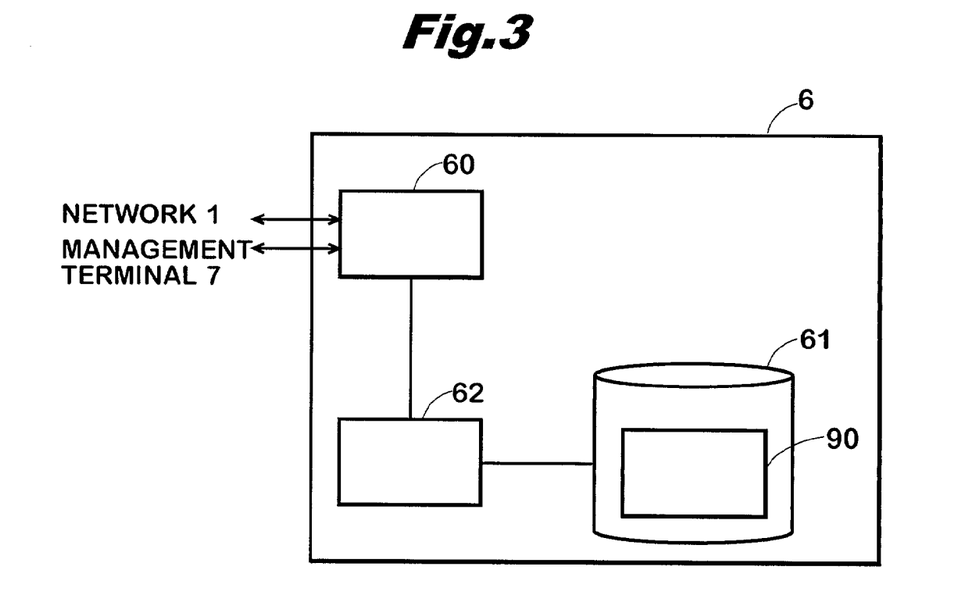
FIG. 3 is a diagram showing a construction of a managing apparatus of the embodiment 1.

FIG. 3 shows a construction of the managing apparatus. To execute the foregoing functions, the managing apparatus 6 includes: a communication unit 60 connected to the network 1 and management terminal 7; a storage unit 61 in which the cyclic unit 90 for collecting the charge information accumulated in the resident unit 80 of the router apparatuses 3A to 3C has been stored; and a processing unit 62 for controlling the operation of the whole managing apparatus 6 including the communication unit 60 and cyclic unit 90. The cyclic unit 90 is constructed by executing a predetermined program stored in the storage unit 61 by the processing unit 62.

The communication unit 60 allows the cyclic unit 90 to circulate among the router apparatuses 3A to 3C via the network 1 and receives the charging system information which is necessary for the operation of the charging system and information for setting the resident unit 80 and cyclic unit 90.

The storage unit 61 stores, for example, the cyclic unit 90 serving as a program, a circulation list (not shown) which specifies, the order of circulation of the router apparatuses 3A to 3C by the cyclic unit, and a period of the circulation or a start time of the circulation. The circulation list is stored not only in the storage unit 61 but also the cyclic unit 90 itself in order to clarify the circulating order of the cyclic unit 90 which is circulating. The storage unit 61 further stores programs and data which are necessary for making the communication unit 60 and processing unit 62 operative.

The processing unit 62 controls communication by the communication unit 60 and an access to the storage unit 61 and makes the cyclic unit 90 function.

Referring to FIG. 1, the management terminal 7 is constructed by, for example, a personal computer and a workstation and used for an administrator of the charging system 100 to set the charging system information necessary for the operation of the charging system into the managing apparatus 6, set the resident unit 80 into the router apparatuses 3A to 3C, and set the cyclic unit 90 into the managing apparatus 6.

Figure 4:
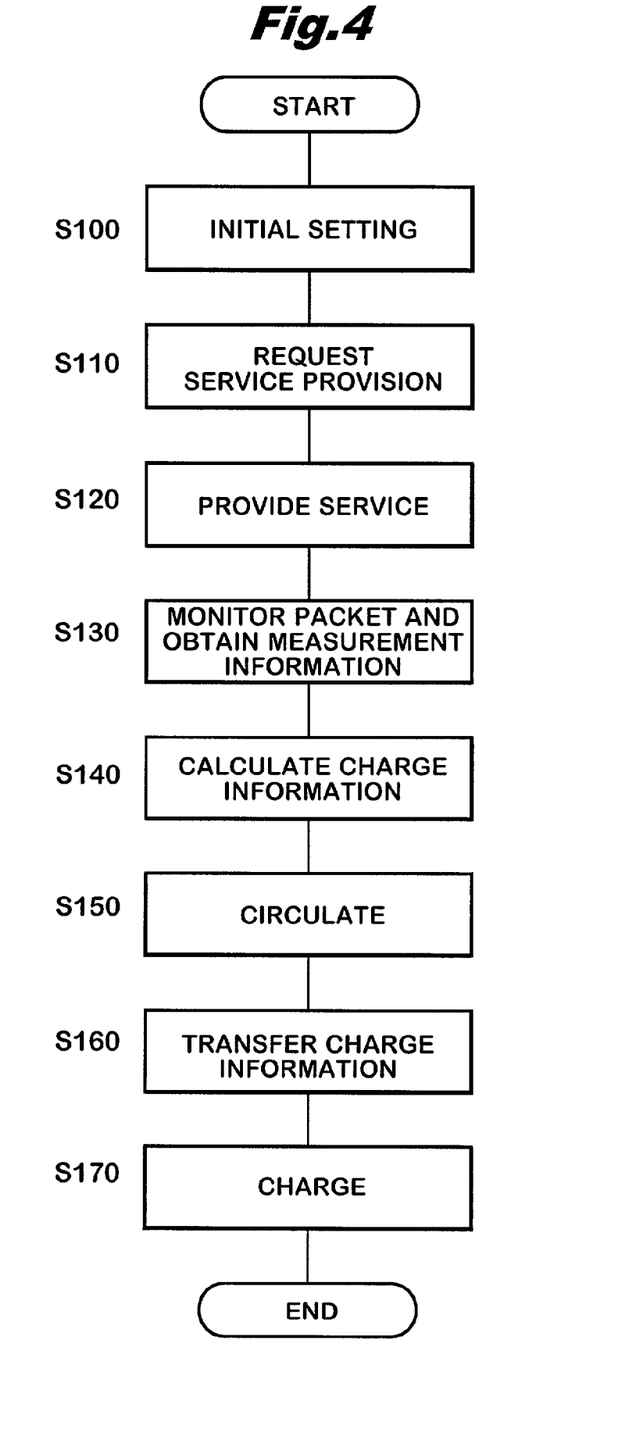
FIG. 4 is a flowchart showing the operation of the charging system of the embodiment 1.

FIG. 4 is a flowchart showing the operation of the charging system of the embodiment 1. The operation will be described hereinbelow with reference to the flowchart.

Step S100:

As an initial setting, the administrator of the charging system 100 transmits the charging system information of the charging system 100, for example, addresses of the router apparatuses 3A to 3C, the topology of the network 1, and the like to the managing apparatus 6 by using the management terminal 7, and transmits, for example, the cyclic unit 90 and resident unit 80 serving as programs to the managing apparatus 6. The managing apparatus 6 stores the received charging system information and cyclic unit 90 into the storage unit 61. The managing apparatus 6 also transmits the received resident unit 80 to the router apparatuses 3A to 3C through the network 1. When the router apparatuses 3A to 3C receive the resident unit 80 from the managing apparatus 6, the received resident unit 80 is stored into the storage unit 31 in each of the router apparatuses 3A to 3C. Thus, the initial setting of the charging system 100 is completed.

Step S110:

Upon completion of the initial setting of the charging system 100, for example, the user of the client apparatus 4A requests the server apparatus 2 to provide the services via the router apparatus 3A by using the client apparatus 4A.

Step S120:

In response to the request for the services from the client apparatus 4A in step S110, the server apparatus 2 starts to provide the service to the client apparatus 4A. That is, the server apparatus 2 sequentially transmits a plurality of packets constructing the services to the client apparatus 4A through the router apparatus 3A.

Step S130:

When the provision of the service is started in step S120, in the router apparatus 3A, the processing unit 32 monitors the packets which are transmitted from the server apparatus 2. That is, the router apparatus 3A measures the packets in order to obtain measurement information such as sender addresses, receiver addresses, user names, packet lengths, the numbers of packets, and the like of a plurality of packets. When the transmission of the packets corresponding to the services is completed, the processing unit 32 finishes the measurement and stores the measured measurement information into the storage unit 31.

Step S140:

When the measurement information is obtained in step S130, in the router apparatus 3A, the resident unit 80 further calculates the charge information necessary for the charging apparatus 5 to charge on the basis of the measurement information obtained by the processing unit 32. The calculation of the charge information is executed, for example, each time the service is requested by the client apparatus. It is desirable to sort a result of the calculation, for example, by every content of the service.

Step S150:

When the charge information is calculated in step S140, the managing apparatus 6 allows the cyclic unit 90 to circulate among the router apparatuses 3A to 3C through the network 1 when the start time of the circulation specified in the circulation list comes. More accurately, in order to circulate the cyclic unit 90 in accordance with the order shown in the circulation list, for example, the managing apparatus 6 transmits the cyclic unit 90 to the router apparatus 3A through the network 1.

When the cyclic unit 90 reaches the router apparatus 3A through the network 1, the cyclic unit 90 collects the charge information from the resident unit 80 of the router apparatus 3A and, thereafter, moves to the router apparatus 3B in accordance with the circulation list. In a manner similar to the above, the cyclic unit 90 collects the charge information from the resident units 80 of the router apparatuses 3B and 3C and, thereafter, returns to the managing apparatus 6 in accordance with the circulation list.

Step S160:

When the cyclic unit 90 is returned in step S150, the managing apparatus 6 transfers the charge information collected by the cyclic unit 90 from the resident units 80 of the router apparatuses 3A to 3C to the charging apparatus 5 through the network 1.

Step 170:

When the charge information is received from the managing apparatus 6 in step S160, the charging apparatus 5 charges the user of the client apparatus 4A which received the services by, for example, the automatic withdrawal, sending of the bill, or the like.

As mentioned above, in the charging system of the embodiment 1, the cyclic unit 90 provided in the managing apparatus 6 serving as a second processing apparatus sequentially circulates among the resident units 80 provided in the router apparatuses 3A to 3C serving as first processing apparatuses, thereby collecting the charge information which was accumulated by the resident units 80 and is used for charging by the charging apparatus 5, and providing the collected charge information for the charging apparatus 5. Therefore, unlike the conventional charging system, it is possible to avoid the generation of the congestion on the network among a plurality of server apparatuses and the charging apparatus which is caused when a plurality of server apparatuses simultaneously and individually transmit the charge information to the charging apparatus in a short time.

Embodiment 2

Figure 5:
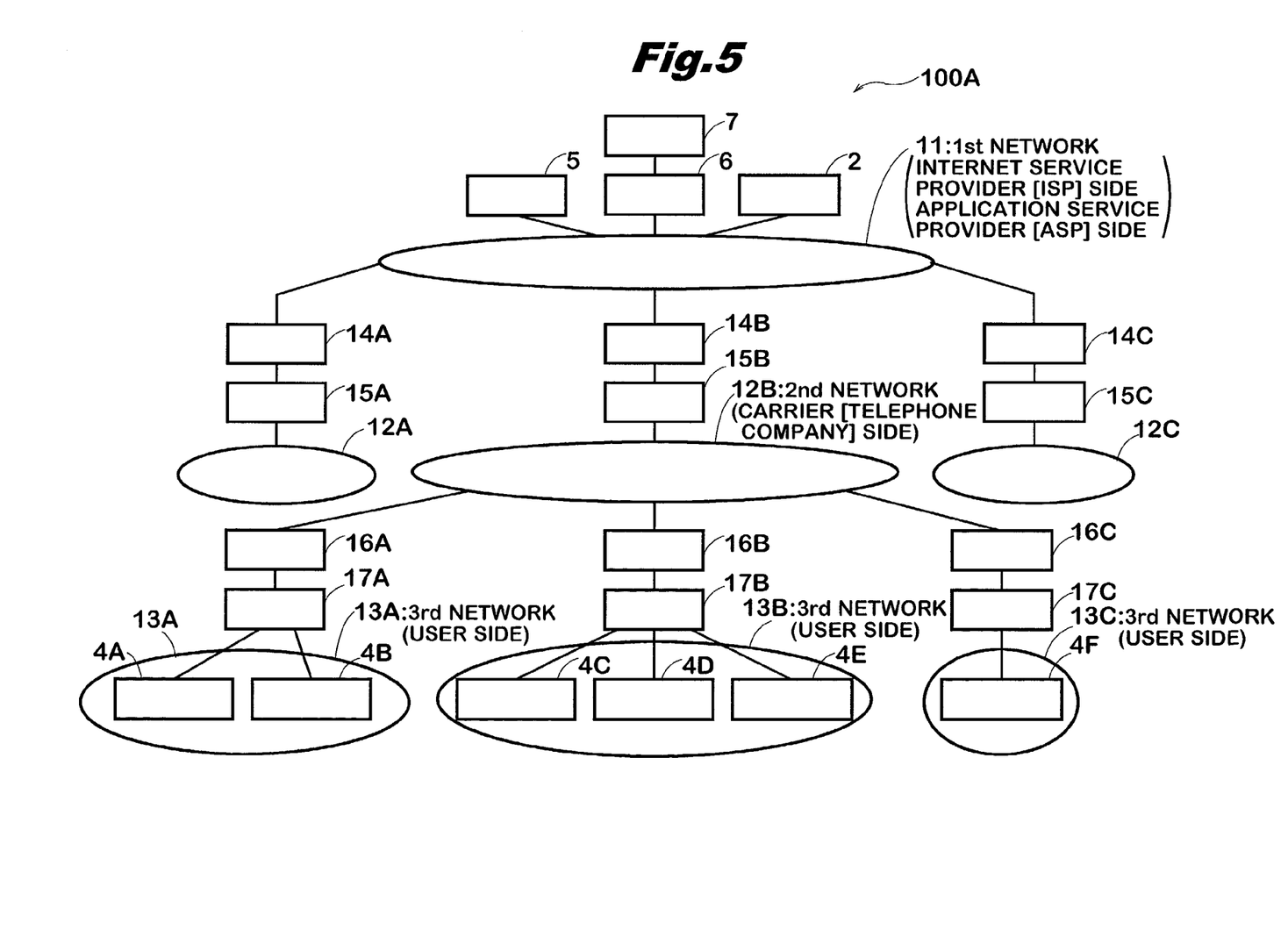
FIG. 5 is a diagram showing a construction of a charging system of the embodiment 2.

FIG. 5 shows a construction of a charging system 100A in which the charging system 100 shown in FIG. 1 is applied to a form of a more general network.

The server apparatus 2, charging apparatus 5, managing apparatus 6, management terminal 7, and client apparatuses 4A, 4B, 4C, 4D, 4E, and 4F shown in FIG. 5 have substantially the same functions and effects as those of the component elements shown in the system of FIG. 1.

A network comprises a first network 11, second networks 12A, 12B, and 12C, and third networks 13A, 13B, and 13C.

The first network 11 is managed by a conventional well-known Internet Service Provider (ISP) or Application Service Provider (ASP). Router apparatuses 14A, 14B, and 14C are arranged at gateways of the first network 11.

Each of the second networks 12A, 12B, and 12C is managed by, for example, carriers such as telephone company, cable television, and the like.

The carriers provide lines connecting the provider to the users.

A router apparatus 15B and router apparatuses 16A, 16B, and 16C are arranged at gateways of the second network 12B. Each of the second networks 12A and 12C also has a construction similar to that of the second network 12B. For simplicity of drawings, the details of the second networks 12A and 12C are omitted here.

The third network 13A is a network which is managed by the user. The third network 13A has a router apparatus 17A at a gateway of the network. In a manner similar to the third network 13A, the third network 13B is a network which is managed by the user. The third network 13B has a router apparatus 17B at a gateway of the network. The third network 13C is a network which is managed by the user. The third network 13C has a router apparatus 17C at a gateway of the network.

Each of the router apparatuses 15B, 16A, 16B, and 16C is a conventional well-known router which is generally used for connecting one LAN or WAN to other LANs or WANs.

Each of the router apparatuses 15B, 16A, 16B, and 16C has a conventional well-known routing function and processes a protocol of the third layer as a network layer of an OSI (Open Systems Interconnection) model.

The charging apparatus 5 is allowed to access the router apparatuses 14A, 14B, and 14C arranged at the gateways of the first network 11. However, when accesses to router apparatuses 15A, 15B, and 15C lower than them are not permitted by the setting of a security called a firewall and a destroying action for preventing an illegal intrusion, the router apparatuses 14A, 14B, and 14C have the same function (charge information collecting and holding function) as that of each of the router apparatuses 3A, 3B, and 3C of the charging system 100 in the foregoing embodiment 1, that is, the function for collecting the charge information and holding it in addition to the general routing function. On the other hand, the router apparatuses 17A, 17B, and 17C are conventional well-known apparatuses which are generally used in a manner similar to the router apparatuses 15B, 16A, 16B, and 16C, have the routing function, and process a protocol of the third layer as a network layer of the OSI model.

On the other hand, when the charging apparatus 5 is allowed to access the router apparatuses 17A, 17B, and 17C arranged at the gateways of the third networks 13A, 13B, and 13C by the setting of the firewall, the router apparatuses 17A, 17B, and 17C have the same charge information collecting and holding function as that of each of the router apparatuses 3A, 3B, and 3C of the charging system 100 in the foregoing embodiment 1 in addition to the general routing function. On the other hand, the router apparatuses 14A, 14B, and 14C are conventional well-known apparatuses which are generally used in a manner similar to the router apparatuses 15B, 16A, 16B, and 16C.

By giving the charge information collecting and holding function to the router apparatuses 17A, 17B, and 17C arranged at the positions nearest to the user as mentioned above and by collecting the information regarding the charge from the router apparatuses by the managing apparatus 6, even if a part of the information which is unconditionally sent from the server apparatus 2 to each client apparatus 4 is dropped before it reaches each router apparatus 17 (17A, 17B, and 17C), the proper information for charging excluding the dropped portion is held in each router apparatus 17. Therefore, the information regarding the charge to which a state of the services which are provided to the user is most reflected can be collected through each router apparatus 17, thereby enabling the proper charge according to the correct amount of information which is received by the user.

Even if the arrangement of the router apparatuses 14 (14A, 14B, and 14C) or router apparatuses 17 (17A, 17B, and 17C) having the charge information collecting and holding function in the charging system 100A of the embodiment 2 is different from that of the router apparatuses 3A, 3B, and 3C having the charge information collecting and holding function shown in the charging system 100 of the embodiment 1, a procedure for collecting the information regarding the charge by the managing apparatus 6 of the charging system 100A is the same as the embodiment 1. Therefore, the charging system 100A shown in FIG. 5 can be fundamentally regarded to be substantially the same as that of the charging system 100 shown in FIG. 1.

Embodiment 3

Figure 6:
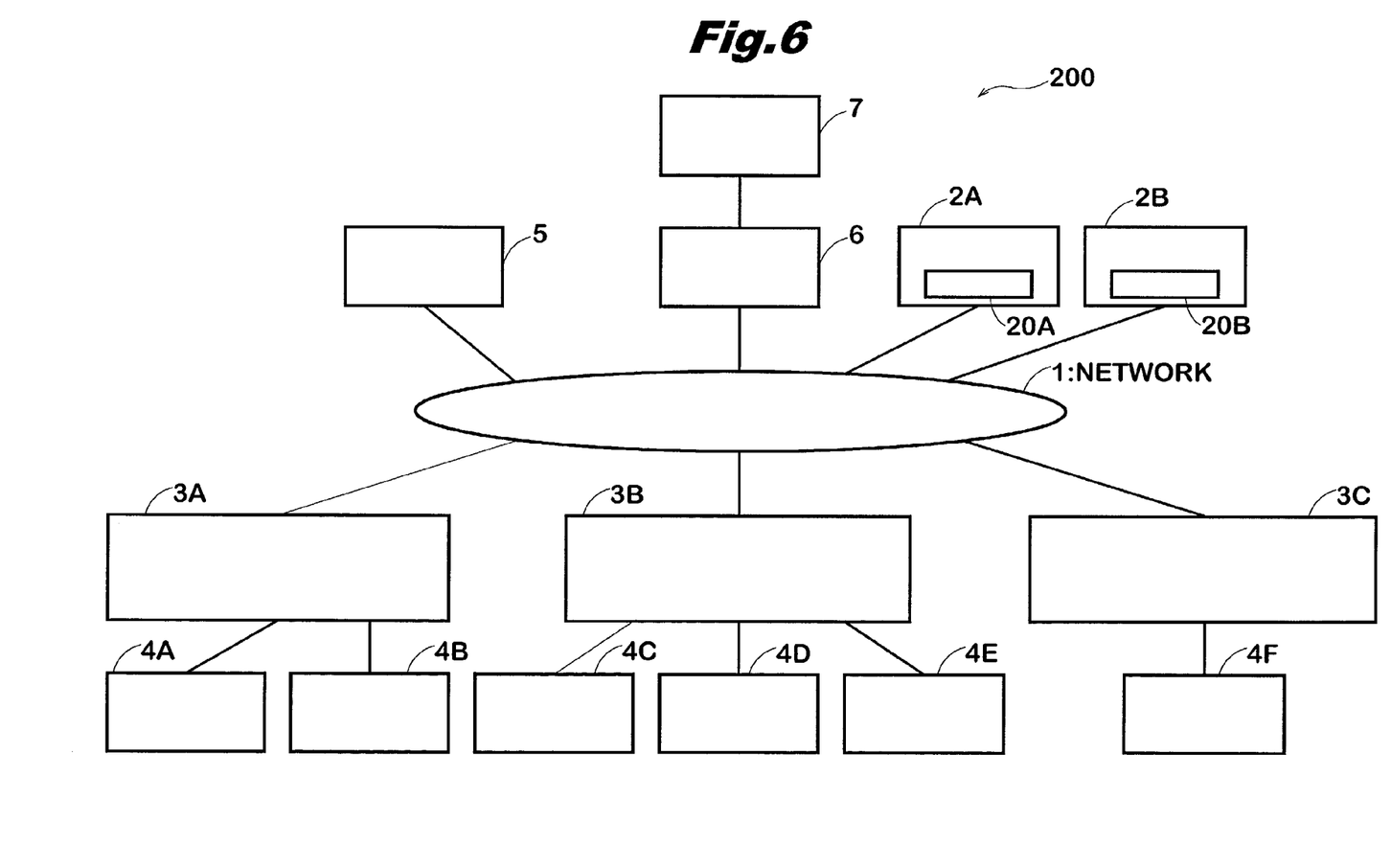
FIG. 6 is a diagram showing a construction of a charging system of the embodiment 3.

FIG. 6 shows a construction of a charging system of the embodiment 3. Unlike the charging system 100 of the embodiment 1, a charging system 200 of the embodiment 3 has two server apparatuses 2A and 2B. Content of service 20A and 20B which are provided by the server apparatuses 2A and 2B is different. For example, the server apparatus 2A provides only music data as a service 20A and the server apparatus 2B provides only video data as a service 20B.

Figure 7:
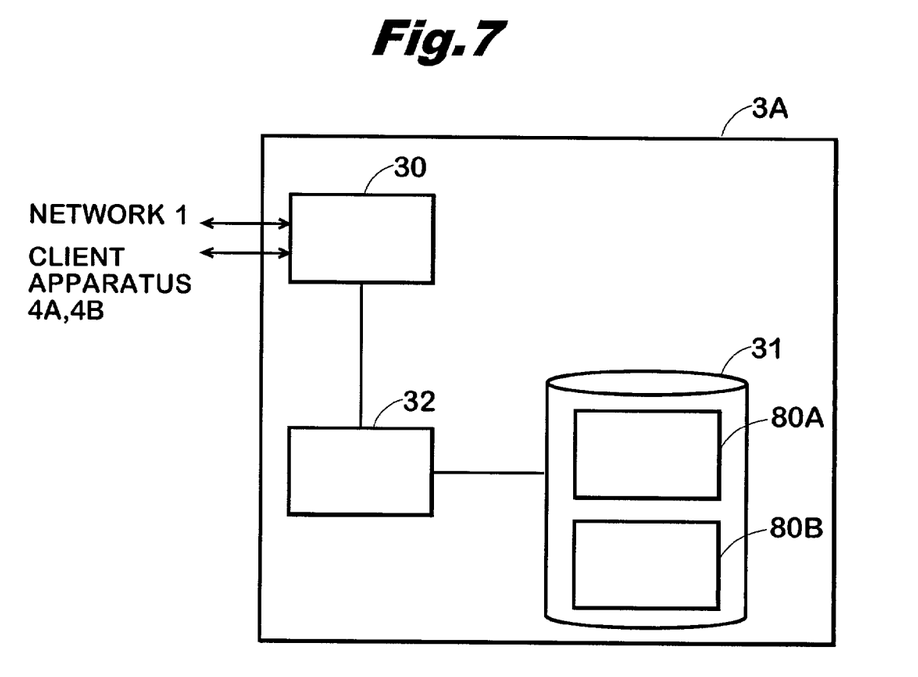
FIG. 7 is a diagram showing a construction of a router apparatus of the embodiment 3.

FIG. 7 shows a construction of a router apparatus of the embodiment 3. Unlike the router apparatus 3A of the embodiment 1, according to the router apparatus 3A of the embodiment 3, two resident units 80A and 80B corresponding to the service 20A from the server apparatus 2A and the service 20B from the server apparatus 2B are provided in the storage unit 31. The resident unit 80A collects the charge information regarding the service 20A from the server apparatus 2A and the resident unit 80B accumulates the charge information regarding the service 20B from the server apparatus 2B, respectively.

Figure 8:
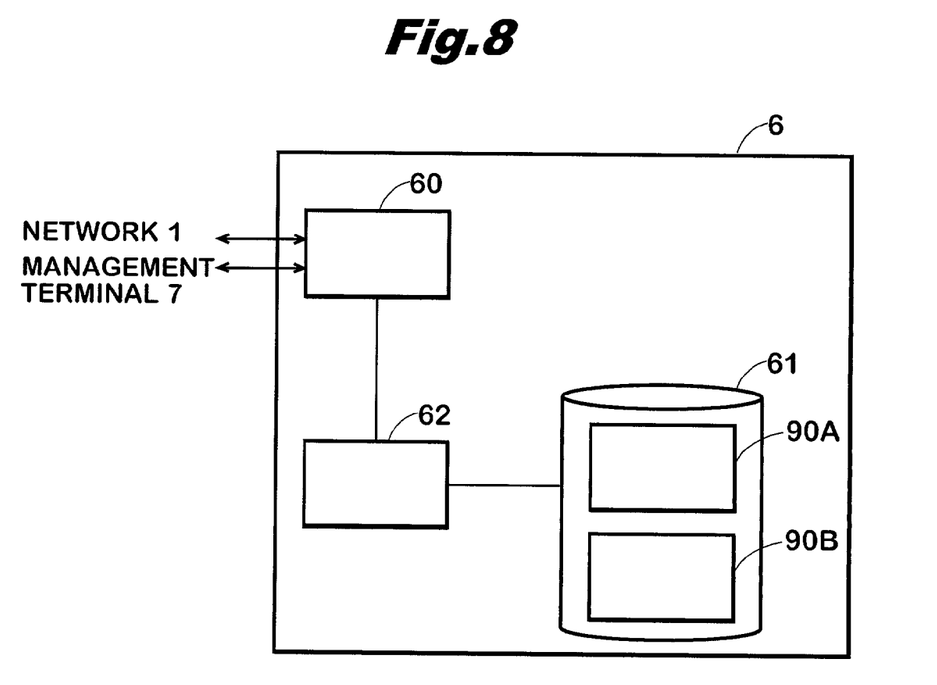
FIG. 8 is a diagram showing a construction of a managing apparatus of the embodiment 3.

FIG. 8 shows a construction of a managing apparatus of the embodiment 3. Unlike the managing apparatus 6 of the embodiment 1, according to the managing apparatus 6 of the embodiment 3, two cyclic units 90A and 90B corresponding to the service 20A from the server apparatus 2A and the service 20B from the server apparatus 2B are provided in the storage unit 61. The cyclic unit 90A collects the charge information for the server apparatus 2A which is accumulated in the resident units 80A provided in the router apparatuses 3A to 3C by the circulation among the router apparatuses 3A to 3C. On the other hand, the cyclic unit 90B collects the charge information for the server apparatus 2B which is accumulated in the resident units 80B provided in the router apparatuses 3A to 3C by the circulation among the router apparatuses 3A to 3C. More specifically, the cyclic units 90A and 90B individually collect the charge information for the server apparatuses 2A and 2B by circulating among the resident units 80A and 80B in the router apparatuses 3A to 3C in accordance with the circulation list described in the embodiment 1. It is desirable that the times when the cyclic units 90A and 90B start to circulate are made different from a viewpoint of reducing a traffic of the network 1.

The operation of the charging system of the embodiment 3 will now be described. Since the operation of the charging system 200 of the embodiment 3 is almost the same as that of the charging system 100 of the embodiment 1, only different points between them will be described with reference to FIG. 4 showing the operation of the charging system of the embodiment 1. For easy explanation and understanding, it is now assumed that the user of the client apparatus 4A requested the provision of the services 20A and 20B by the server apparatuses 2A and 2B.

Step S130:

When the provision of the services 20A and 20B is started through steps S100 to S110 in FIG. 4, in the router apparatus 3A, the processing unit 32 monitors the packets which are transmitted from the server apparatuses 2A and 2B. That is, the router apparatus 3A measures the packets in order to obtain the sender addresses, receiver addresses, user names, packet lengths, the numbers of packets, and the like of a plurality of packets mentioned above. Upon completion of the transmission of the packets corresponding to the services 20A and 20B, the processing unit 32 finishes the measurement and stores the measured measurement information into the storage unit 31.

Step S140:

In the router apparatus 3A, the resident unit 80A further calculates the charge information necessary for the charging apparatus 5 to charge for the service 20A on the basis of the measurement information regarding the service 20A which was obtained by the processing unit 32. The resident unit 80B further calculates the charge information necessary for the charging apparatus 5 to charge for the service 20B on the basis of the measurement information regarding the service 20B which was obtained by the processing unit 32.

Step S150:

The managing apparatus 6 allows the cyclic unit 90A to circulate among the router apparatuses 3A to 3C through the network 1 when the start time of the circulation specified in the circulation list for the cyclic unit 90A comes. Similarly, the managing apparatus 6 allows the cyclic unit 90B to circulate among the router apparatuses 3A to 3C through the network 1 when the start time of the circulation specified in the circulation list for the cyclic unit 90B comes.

When the cyclic unit 90A reaches the router apparatus 3A through the network 1, the cyclic unit 90 collects the charge information regarding the service 20A from the resident unit 80A of the router apparatus 3A and, thereafter, moves to the router apparatus 3B in accordance with the circulation list. In a manner similar to the above, the cyclic unit 90A collects the charge information regarding the service 20A from the resident unit 80A of the router apparatus 3B and the resident unit 80A of the router apparatus 3C and, thereafter, returns to the managing apparatus 6 in accordance with the circulation list for the cyclic unit 90A.

In a manner similar to the above, the cyclic unit 90B also collects the charge information regarding the service 20B from the resident units 80B of the router apparatuses 3A to 3C and, thereafter, returns to the managing apparatus 6 in accordance with the circulation list for the cyclic unit 90B.

Step S160:

When the cyclic unit 90A returns, the managing apparatus 6 transfers the charge information which was collected by the cyclic unit 90A and relates to the service 20A of the server apparatus 2A to the charging apparatus 5 through the network 1. When the cyclic unit 90B returns, the managing apparatus 6 transfers the charge information which was collected by the cyclic unit 90B and relates to the service 20B of the server apparatus 2B to the charging apparatus 5 through the network 1.

As mentioned above, in the charging system of the embodiment 3, the resident units 80A and 80B which are provided in the router apparatuses 3A to 3C and correspond to the different services 20A and 20B which are provided by the server apparatuses 2A and 2B accumulate the charge information regarding the service 20A and the charge information regarding the service 20B, respectively. The cyclic unit 90A collects the charge information regarding the service 20A accumulated in the resident unit 80A. The cyclic unit 90B collects the charge information regarding the service 20B accumulated in the resident unit 80B. The cyclic units 90A and 90B transfer the collected charge information regarding the services 20A and 20B to the charging apparatus 5. Therefore, in a manner similar to the charging system 100 of the embodiment 1, it is possible to avoid the generation of the congestion due to the concentrated transmission and reception of the charge information on the network 1 between each of the server apparatuses 2A and 2B and the charging apparatus 5.

Embodiment 4

A charging system of the embodiment 4 will now be described. In a manner similar to the charging system 200 of the embodiment 3, the charging system of the embodiment 4 has the two server apparatuses 2A and 2B shown in FIG. 6. Each of the router apparatuses 3A to 3C also has the two resident units 80A and 80B shown in FIG. 7 in a manner similar to the embodiment 3. The managing apparatus 6 has the one cyclic unit 90 shown in FIG. 3 in a manner similar to the charging system 100 of the embodiment 1.

The operations of the server apparatuses 2A and 2B and resident units 80A and 80B of the embodiment 4 are similar to those of the embodiment 3 mentioned above. On the other hand, the operation of the cyclic unit 90 of the embodiment 4 differs from those of the cyclic units 90, 90A, and 90B of the embodiments 1 and 3 mentioned above. Both of the charge information regarding the service 20A from the server apparatus 2A and the charge information regarding the service 20B from the server apparatus 2B, that is, the charge information which is accumulated in the resident units 80A and 80B provided in the router apparatuses 3A to 3C is collected by the circulation among the router apparatuses 3A to 3C.

The operation of the charging system of the embodiment 4 will now be described. Since the operation of the charging system of the embodiment 4 is almost the same as those of the charging systems of the embodiments 1 and 3, it will be described hereinbelow with reference to FIG. 4 showing the operation of the embodiment 1. For easy explanation and understanding, it is now assumed that the user of the client apparatus 4A requested the provision of the services 20A and 20B by the server apparatuses 2A and 2B in a manner similar to the embodiment 3.

Step S150:

After the resident units 80A and 80B in the router apparatuses 3A to 3C calculated the charge information regarding the services 20A and 20B through steps S100 to S140 in the embodiment 3, the managing apparatus 6 allows the cyclic unit 90 to circulate among the router apparatuses 3A to 3C through the network 1 when the start time of the circulation specified in the circulation list comes.

When the cyclic unit 90 reaches the router apparatus 3A through the network 1, the cyclic unit 90 collects both of the charge information regarding the services 20A and 20B from both of the resident units 80A and 80B of the router apparatus 3A and, thereafter, moves to the router apparatus 3B in accordance with the circulation list. In a manner similar to the above, the cyclic unit 90 collects both of the charge information from both of the resident units 80A and 80B of the router apparatus 3B, collects both of the charge information from both of the resident units 80A and 80B of the router apparatus 3C, and, thereafter, returns to the managing apparatus 6 in accordance with the circulation list.

Step S160:

When the cyclic unit 90 returns, the managing apparatus 6 transfers the charge information regarding the service 20A from the server apparatus 2A and the charge information regarding the service 20B from the server apparatus 2B, which were collected by the cyclic unit 90, to the charging apparatus 5 through the network 1.

As mentioned above, in the charging system of the embodiment 4, the one cyclic unit 90 provided in the managing apparatus 6 collects both of the charge information regarding the services 20A and 20B which are accumulated by the two resident units 80A and 80B provided in the router apparatuses 3A to 3C and provides the collected charge information to the charging apparatus 5. Therefore, it is possible to avoid the generation of the congestion on the network between the server apparatus and the charging apparatus 5 in a manner similar to the charging systems of the embodiments 1 and 3.

Further, unlike the charging system of the embodiment 3, since one cyclic unit 90 collects both of the charge information regarding the services 20A and 20B, the charge information can be more efficiently collected as compared with that of the embodiment 2 in which the charge information is collected by using the two cyclic units 90A and 90B.

Embodiment 5

A charging system of the embodiment 5 will now be described. In a manner similar to the charging system 200 of the embodiment 3, the charging system of the embodiment 5 has the two server apparatuses 2A and 2B shown in FIG. 6. On the other hand, each of the router apparatuses 3A to 3C has the one resident unit 80 shown in FIG. 2 in a manner similar to the embodiment 1. The managing apparatus 6 also has the one cyclic unit 90 shown in FIG. 3 in a manner similar to the embodiment 1.

The operations of the server apparatuses 2A and 2B of the embodiment 5 are similar to those of the embodiment 3 mentioned above. On the other hand, unlike the resident unit 80 of the embodiment 1, the resident units 80 provided in the router apparatuses 3A to 3C accumulate both of the charge information regarding the service 20A which is provided by the server apparatus 2A and the charge information regarding the service 20B which is provided by the server apparatus 2B. Unlike the cyclic unit 90 of the embodiment 1, the cyclic unit 90 provided in the managing apparatus 6 also collects both of the charge information regarding the services 20A and 20B.

The operation of the charging system of the embodiment 5 will now be described. Since the operation of the charging system of the embodiment 5 is almost the same as those of the charging systems of the embodiments 1 to 4, it will be described hereinbelow with reference to FIG. 4 showing the operation of the embodiment 1. For easy explanation and understanding, it is now assumed that the user of the client apparatus 4A requested the provision of the services 20A and 20B by the server apparatuses 2A and 2B in a manner similar to the embodiments 3 and 4.

Step S150:

After the resident units 80 in the router apparatuses 3A to 3C calculated the charge information regarding the services 20A and 20B through steps S100 to S140 in the embodiment 1, the managing apparatus 6 allows the cyclic unit 90 to circulate among the router apparatuses 3A to 3C through the network 1 when the start time of the circulation specified in the circulation list comes.

When the cyclic unit 90 reaches the router apparatus 3A, the cyclic unit 90 collects both of the charge information regarding the services 20A and 20B from the resident unit 80 of the router apparatus 3A and, thereafter, moves to the router apparatus 3B in accordance with the circulation list. In a manner similar to the above, the cyclic unit 90 collects both of the charge information regarding the services 20A and 20B from the resident unit 80 of the router apparatus 3B, collects both of the charge information regarding the services 20A and 20B from the resident unit 80 of the router apparatus 3C, and thereafter, returns to the managing apparatus 6 in accordance with the circulation list.

Step S160:

When the cyclic unit 90 returned, the managing apparatus 6 transfers both of the charge information regarding the service 20A from the server apparatus 2A and the charge information regarding the service 20B from the server apparatus 2B, which were collected by the cyclic unit 90, to the charging apparatus 5 through the network 1.

As mentioned above, according to the charging system of the embodiment 5, the one resident unit 80 provided in each of the router apparatuses 3A to 3C accumulates the charge information regarding the two services 20A and 20B and the one cyclic unit 90 provided in the managing apparatus 6 collects both of the charge information regarding the two services 20A and 20B which were accumulated in the resident unit 80 and transfers the collected charge information to the charging apparatus 5. Therefore, it is possible to avoid the generation of the congestion on the network between the server apparatus and the charging apparatus in a manner similar to the embodiments 1 to 4.

Further, in the charging system of the embodiment 5, one resident unit accumulates the charge information regarding the two services and one cyclic unit collects the charge information regarding the two services accumulated in the one resident unit. Therefore, the accumulation of the charge information and the collection of the charge information can be efficiently executed.

Embodiment 6

A charging system of the embodiment 6 will now be described. Unlike the operations of the embodiments 1 to 5 in which the charge is performed after the services were provided, according to the charging system of the embodiment 6, the services are provided in accordance with the prepaid money amount which has been paid prior to the provision of the services.

A construction of the whole charging system of the embodiment 6 can be one of those of the charging systems of the embodiments 1 to 5. According to the charging system of the embodiment 6, the cyclic unit 90 which reached the router apparatuses 3A to 3C controls the provision of the services to the client apparatuses 4A to 4F by the server apparatus 2 on the basis of the prepaid amount.

Figure 9:
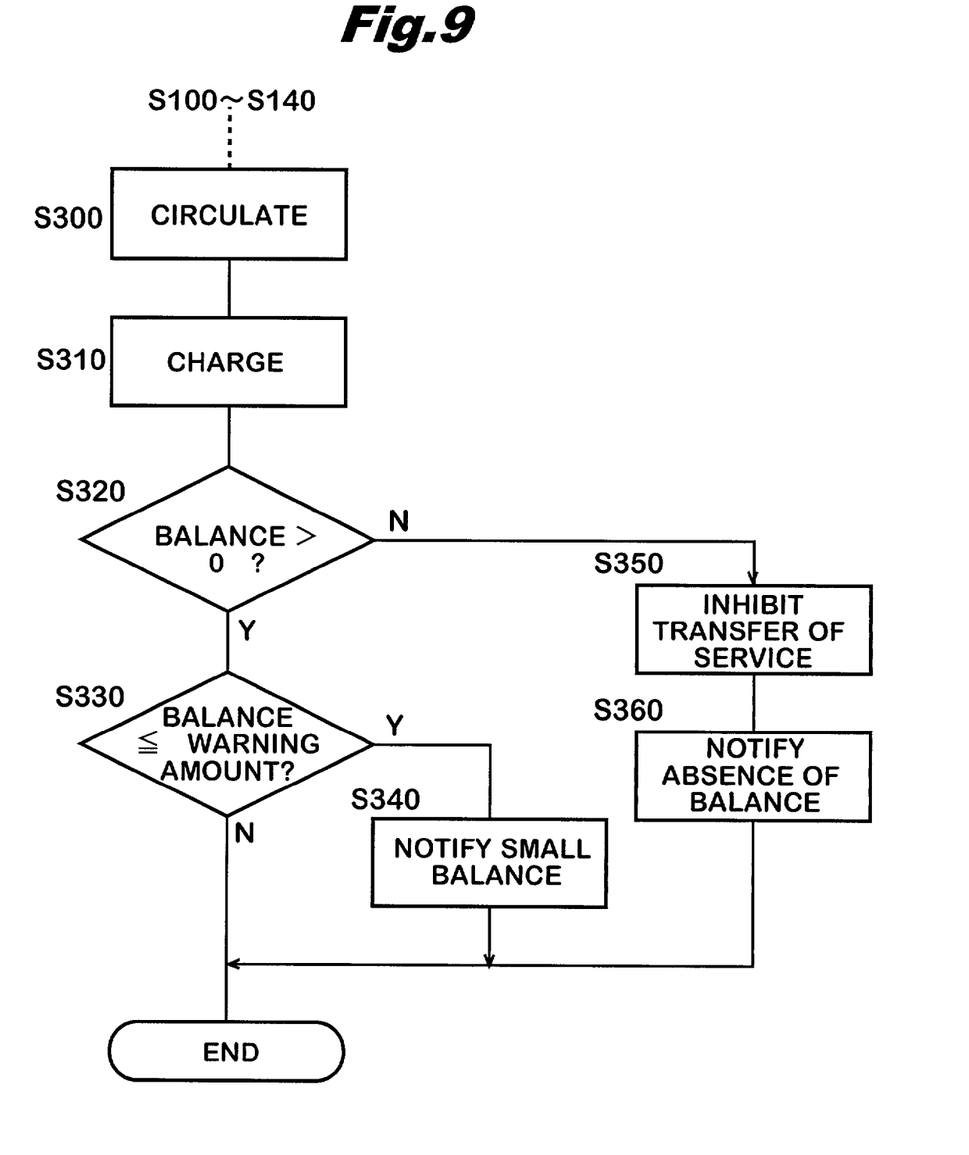
FIG. 9 is a flowchart showing the operation of a charging system of the embodiment 6.

FIG. 9 is a flowchart showing the operation of the embodiment 6. Since the operation of the charging system of the embodiment 6 is almost the same as those of the charging systems of the embodiments 1 to 5, it will be described hereinbelow with reference to FIG. 4 showing the operation of the embodiment 1.

For easy explanation and understanding, it is now assumed that the user of the client apparatus 4A has prepaid an arbitrary money amount with respect to the services which are provided by the server apparatus 2 and the user name, the prepaid amount, and a balance have been stored into the storage unit 31 of the router apparatus 3A by the management terminal 7, managing apparatus 6, or client apparatus 4A.

Step S300:

By a procedure similar to that in steps S100 to S140 in FIG. 4, the managing apparatus 6 allows the cyclic unit 90 to circulate among the router apparatuses 3A to 3C through the network 1 when the start time of the circulation specified in the circulation list comes.

Step S310:

When the cyclic unit 90 reaches the router apparatus 3A through the network 1, the cyclic unit 90 receives the charge information accumulated in the resident unit 80 of the router apparatus 3A from the resident unit 80.

The resident unit 80 of the router apparatus 3A subtracts a charge amount included in the charge information from the prestored balance independent of the operation of the cyclic unit 90, thereby obtaining a new balance.

Step S320:

The resident unit 80 discriminates whether the newly obtained balance is a positive value or not.

Step S330:

When the balance is the positive value, the resident unit 80 discriminates whether the balance is equal to or less than a warning balance serving as a threshold value for notifying the user of the fact that the balance is small or not.

Step S340:

When it is determined that the balance is equal to or less than the predetermined warning balance, the resident unit 80 notifies the user of the client apparatus 4A of the fact that the balance enough to receive the services is small.

Step S350:

When the balance is not the positive value, the resident unit 80 instructs the router apparatus 3A to inhibit the transfer of the services from the server apparatus 2 to the client apparatus 4A. By the inhibition, when the provision of the service 20A is requested by the client apparatus 4A, the router apparatus 3A refuses the request. When the service 20A is provided from the server apparatus 2A, the router apparatus 3A does not transfer the service 20A to the client apparatus 4A. To prevent the server apparatus 2A from retrying the provision of the service, the router apparatus 3A returns a reception response acknowledgment indicating that the service 20A was received to the server apparatus 2A.

Step S360:

When the balance is not the positive value, the resident unit 80 notifies the managing apparatus 6 of the fact that the balance of the user of the client apparatus 4A regarding the service of the server apparatus 2 is not the positive value. When the notification is received from the resident unit 80, the managing apparatus 6 notifies the user of the client apparatus 4A of the contents of the notification.

Unlike the embodiments 1 to 5, since the charging apparatus 5 does not need to settle the charge, even if the cyclic unit 90 returns to the managing apparatus 6 in accordance with the circulation list, it does not provide the charge information to the charging apparatus 5.

As mentioned above, according to the charging system of the embodiment 6, unlike the embodiments 1 to 5 in which the user is charged after the service was provided, the resident unit 80 controls the provision of the service which is requested by the user on the basis of the prepaid amount which has previously been paid by the user in the router apparatuses 3A to 3C. Therefore, since there is no need to provide the charge information to the charging apparatus 5, it is eventually possible to avoid the generation of the congestion on the network between the server apparatus and the charging apparatus 5 in a manner similar to the embodiments 1 to 5.

Further, since the resident unit 80 permits or inhibits the provision of the services to the client apparatuses 4A to 4F by the server apparatus 2 on the basis of the prepaid amount, for example, it is possible to avoid a situation such that although the server apparatus 2 provided the service, the fee cannot be collected from the user or a situation such that the client apparatuses 4A to 4F receive services of a price which is fairly higher than a budget.

According to the charging system of the embodiment 6, the resident unit 80 controls the provision of the services to the client apparatuses from the server apparatus on the basis of the prepaid amount. The provision of the services can be also controlled on the basis of a contract communication time which has previously been contracted in place of the prepaid amount.

In this case, by monitoring a communication time of the packets by the router apparatuses 3A to 3C, the resident unit 80 calculates a remaining communication time by subtracting the communication time from the contract communication time, instructs the router apparatuses 3A to 3C to inhibit the transfer of the services on the basis of the obtained remaining time in a manner similar to the operation based on the balance, and notifies the managing apparatus 6 of the fact that there is no remaining time. By such an operation, it is possible to avoid the generation of the congestion between the server apparatus and the charging apparatus in a manner similar to the embodiments 1 to 5. Further, since a process for converting the communication time into a money amount or the like is unnecessary, the calculating process can be lightened as compared with that by the control of the service provision based on the prepaid amount.

According to the charging systems of the embodiments 1 to 6, the cyclic unit 90 circulates among the router apparatuses 3A to 3C in accordance with the circulation list in which the circulating order, circulating period, and the like have previously been specified. It is desirable that the administrator of the charging system arbitrarily inputs a command for specifying the circulation of the cyclic unit 90 from the management terminal 7 in place of the circulation list.

In this case, the administrator inputs a circulating command regarding the circulation start time of the cyclic unit 90, the router apparatuses in which the cyclic unit 90 should circulate among the router apparatuses 3A to 3C, the circulating order, the circulating period, and the like from the management terminal 7. When the inputted circulation command is received from the management terminal 7, the managing apparatus 6 stores it into the cyclic unit 90 and storage unit 61. The cyclic unit 90 circulates in accordance with the circulation command inputted from the management terminal 7 in place of the circulation list. Since the cyclic unit 90 circulates in accordance with the circulating command designated by the administrator as mentioned above, the charge information can be collected more flexibly as compared with the charging systems of the embodiments 1 to 6.

According to the charging systems of the invention, as mentioned above, the cyclic unit which the second processing apparatus has sequentially circulates, via the network, among a plurality of first processing apparatuses for accumulating the charge information for charging which is performed by the charging apparatus with respect to the provision of the services to the client apparatuses from the server apparatus. Therefore, after the charge information accumulated in the plurality of first processing apparatuses was collected, the collected charge information is provided to the charging apparatus. Thus, the congestion as an concentrated and excessive traffic on the network that is caused when a plurality of server apparatuses transmit the charge information to the charging apparatus in a short time as in the conventional system can be avoided.

The present invention is not limited to the foregoing embodiments but many modifications and variations are possible within the spirit and scope of the appended claims of the invention.

What is claimed is:

1. A charging system comprising:
   a first client apparatus;
   a second client apparatus;
   a server apparatus which provides at least one service to said first client apparatus and said second client apparatus via a network;
   a charging apparatus connected to said network in order to a charge said first client apparatus and said second client apparatus with respect to the provision of said at least one service;
   a first processing apparatus which is connected to said network in order to control the provision of said at least one service from said server apparatus to said first client apparatus and accumulate information for charging by said charging apparatus with respect to said at least one service when said at least one service is provided to said first client apparatus via said first processing apparatuses; and
   a second processing apparatus which is connected to said network in order to control the provision of said at least one service from said server apparatus to said second client apparatus and accumulate information for charging by said charging apparatus with respect to said at least one service when said at least one service is provided to said second client apparatus via said second processing apparatuses; and
   a third processing apparatus which comprises a cyclic unit which includes a circulation list specifying a circulation order and which circulates from said third processing apparatus to said first processing apparatus, from said first processing apparatus to said second processing apparatus, and from said second processing apparatus to said third processing apparatus via said network in accordance with said circulation order in order to collect the information for charging accumulated in said first processing apparatus and said second processing apparatus; and
   further comprising a plurality of the at least one service, and wherein
   said cyclic unit is a first cyclic unit corresponding to a first one of the services, said third processing apparatus has at least one second cyclic unit corresponding to a second one of the services, and said first and at least one second cyclic units each collect said information for charging in said first processing apparatus for its corresponding service and said second processing apparatus for its corresponding service.

2. A system according to claim 1, wherein each of said cyclic units of the third processing specifies a different time to start its circulation from said third processing apparatus to said first processing apparatus, from said first processing apparatus to said second processing apparatus, and from said second processing apparatus to said third processing apparatus.

3. A system according to claim 1,
   wherein said first processing apparatus controls the provision of said at least one service to one of client apparatuses from said server apparatus with reference to an amount of money which has been predetermined by said one of client apparatus for the purpose of providing said at least one service.

4. A system according to claim 1, wherein said first processing apparatus controls the provision of said at least one service to one of client apparatuses from said server apparatus with reference to a time which has been predetermined by said one of client apparatus for the purpose of providing said at least one service.

5. A system according to claim 1, further comprising a management terminal connected to the third processing apparatus for inputting the circulation list and other information for controlling operation of the charging system.

6. A system according to claim 1, wherein said first processing apparatus is connected to at least one of plurality of client apparatuses.

7. A system according to claim 6, wherein each first processing apparatus generates the information for charging with respect to the at least one client apparatus to which it is connected.

8. A system according to claim 1, wherein said first processing apparatus is a first router apparatus and said second processing apparatus is a second router apparatus and said third processing apparatus is a managing apparatus which has a function of managing the charging system.

9. A system according to claim 1, wherein said second processing apparatus further has a storage unit, the circulation list further being stored in said storage unit.

10. A system according to claim 1, wherein said circulation list further specifies a circulation period for circulation of the cyclic unit among the plurality of first processing apparatuses.

11. A charging system comprising:
    a first client apparatus;
    a second client apparatus;
    a server apparatus which provides at least one service to said first client apparatus and said second client apparatus via a network;
    a charging apparatus connected to said network in order to a charge said first client apparatus and said second client apparatus with respect to the provision of said at least one service;
    a first processing apparatus which is connected to said network in order to control the provision of said at least one service from said server apparatus to said first client apparatus and accumulate information for charging by said charging apparatus with respect to said at least one service when said at least one service is provided to said first client apparatus via said first processing apparatuses; and
    a second processing apparatus which is connected to said network in order to control the provision of said at least one service from said server apparatus to said second client apparatus and accumulate information for charging by said charging apparatus with respect to said at least one service when said at least one service is provided to said second client apparatus via said second processing apparatuses; and
    a third processing apparatus which comprises a cyclic unit which includes a circulation list specifying a circulation order and which circulates from said third processing apparatus to said first processing apparatus, from said first processing apparatus to said second processing apparatus, and from said second processing apparatus to said third processing apparatus via said network in accordance with said circulation order in order to collect the information for charging accumulated in said first processing apparatus and said second processing apparatus; and wherein said at least one service is a plurality of services, and said cyclic unit is a single cyclic unit that collects said information for charging accumulated in said first processing apparatus and said second processing apparatus for every one of said plurality of services.

12. A system according to claim 11, wherein each of said first processing apparatus accumulates said information for charging of said plurality of services.

13. system according to claim 11,
wherein said first processing apparatus controls the provision of said at least one service to one of client apparatuses from said server apparatus with reference to an amount of money which has been predetermined by said one of client apparatus for the purpose of providing said at least one service.

14. A system according to claim 11, wherein said first processing apparatus controls the provision of said at least one service to one of client apparatuses from said server apparatus with reference to a time which has been predetermined by said one of client apparatus for the purpose of providing said at least one service.

15. A system according to claim 11, further comprising a management terminal connected to the third processing apparatus for inputting the circulation list and other information for controlling operation of the charging system.

16. A system according to claim 11, wherein said first processing apparatus is connected to at least one of plurality of client apparatuses.

17. A system according to claim 16, wherein each first processing apparatus generates the information for charging with respect to the at least one client apparatus to which it is connected.

18. A system according to claim 11, wherein said first processing apparatus is a first router apparatus and said second processing apparatus is a second router apparatus and said third processing apparatus is a managing apparatus which has a function of managing the charging system.

19. A system according to claim 11, wherein said second processing apparatus further has a storage unit, the circulation list further being stored in said storage unit.

20. A system according to claim 11, wherein said circulation list further specifies a circulation period for circulation of the cyclic unit among the plurality of first processing apparatuses.

* * * * *

UNITED STATES PATENT AND TRADEMARK OFFICE
CERTIFICATE OF CORRECTION

PATENT NO. : 7,620,557 B2 Page 1 of 1
APPLICATION NO. : 10/050135
DATED : November 17, 2009
INVENTOR(S) : Nakamatsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1877 days.

Signed and Sealed this

Twenty-sixth Day of October, 2010

David J. Kappos
*Director of the United States Patent and Trademark Office*